L. S. PFOUTS.
FILLING MECHANISM.
APPLICATION FILED OCT. 1, 1914.
1,189,620.
Patented July 4, 1916.
2 SHEETS—SHEET 1.
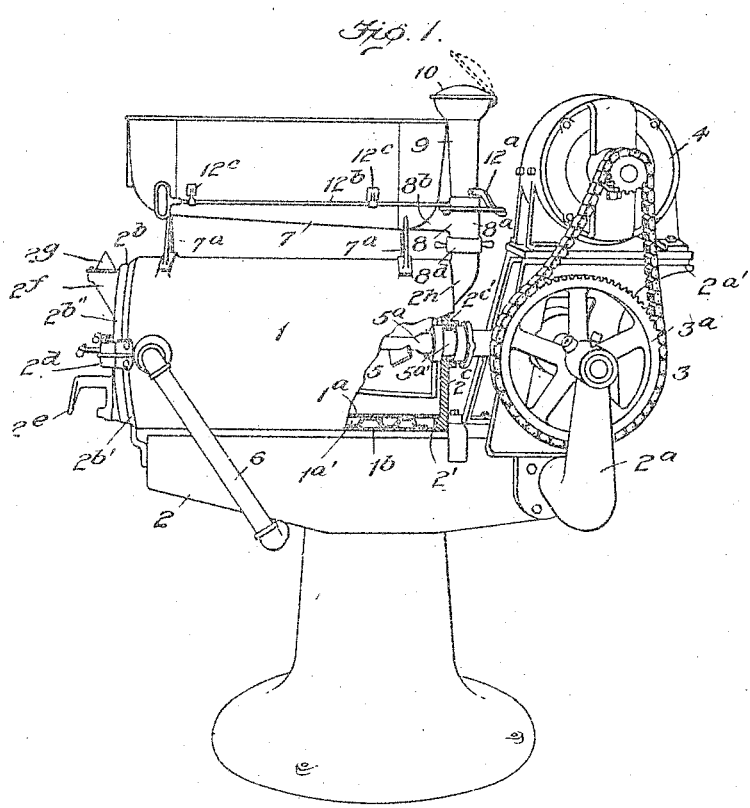
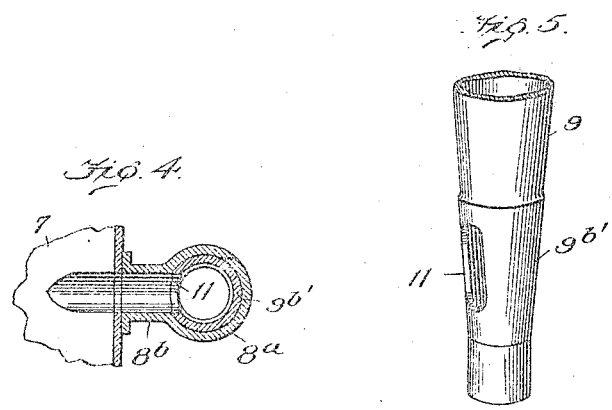
Witnesses
Edwin L Bradford
Geo B Pitts
Inventor
Leroy S. Pfouts
By
Attorney

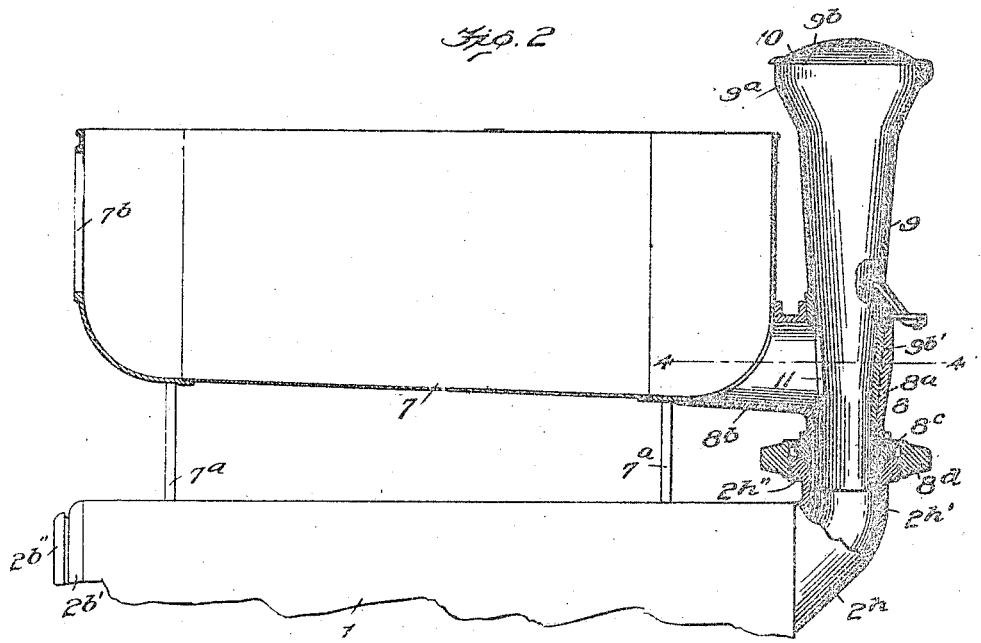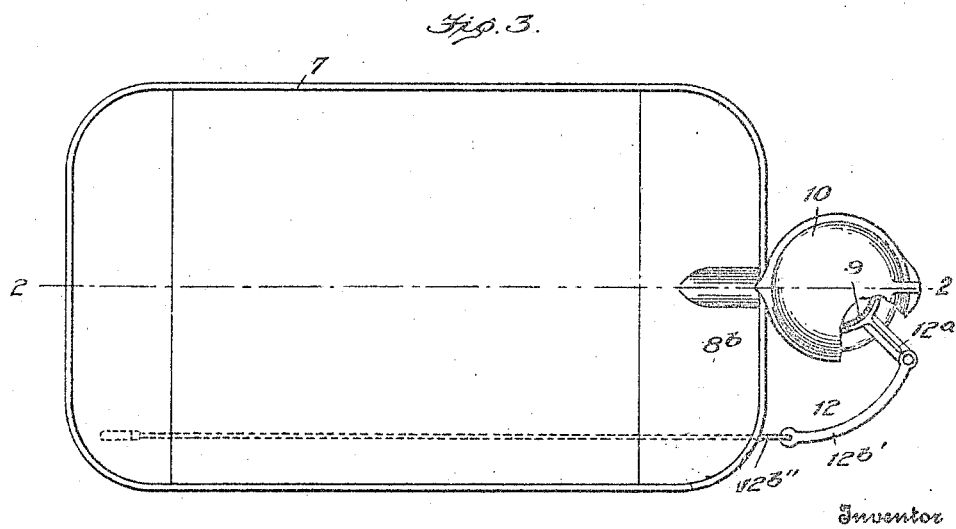

UNITED STATES PATENT OFFICE.

LEROY S. PFOUTS, OF CANTON, OHIO, ASSIGNOR TO THE MILLER PASTEURIZING MACHINE COMPANY, OF CANTON, OHIO, A CORPORATION OF NEW JERSEY.

FILLING MECHANISM.

1,189,620.   Specification of Letters Patent.   Patented July 4, 1916.

Application filed October 1, 1914. Serial No. 864,459.

*To all whom it may concern:*

Be it known that I, LEROY S. PFOUTS, a citizen of the United States, residing at Canton, in the county of Stark and State of Ohio, have invented certain new and useful Improvements in and Relating to Filling Mechanism, of which the following is a specification.

This invention relates to filling mechanism, and more particularly to valve construction for controlling the filling of a receptacle such as the freezing cylinder of an ice cream freezer.

For the purpose of illustration, I have, in the accompanying drawings shown and herein described one form of apparatus embodying my invention.

Figure 1 is a side elevation of a liquid freezing apparatus embodying my invention, parts being broken away. Fig. 2 is a section on the line 2—2 of Fig. 3. Fig. 3 is a top plan view of the liquid holding tank and parts associated therewith, the freezer being omitted. Fig. 4 is a section on the line 4—4 of Fig. 2. Fig. 5 is a fragmentary view of the inlet member.

For the purpose of disclosing one embodiment of my invention, I have selected to illustrate it in connection with a self emptying brine ice cream freezer of the horizontal type.

In the drawings, 1 indicates as an entirety a freezer which is mounted on a suitable support 2. At one end, the support 2 may be provided with brackets $2^a$, $2^a$, the former supporting a shaft for gearing 3, and the latter supporting a drive-means, such as a motor 4. The motor 4 is preferably connected by belting—a silent drive chain for instance—with the main gear $3^a$ of the gearing 3.

The freezer 1 preferably comprises an inner cylinder $1^a$ and an outer cylinder $1^b$ spaced from the inner cylinder.

$2^b$, $2^c$ indicate the front and rear heads, respectively, of the freezer. The front head $2^b$ may comprise an annular member $2^{b\prime}$ and a cover $2^{b\prime\prime}$ adapted to be detachably connected, by devices $2^d$, to the member $2^{b\prime}$. In its lower portion, the cover $2^{b\prime\prime}$ is provided with a discharge opening, the valve or gate for which is controlled by a handle $2^e$. Near its upper portion the cover $2^{b\prime\prime}$ may be provided with an integral projecting wall $2^f$, preferably extending upwardly, and surrounding an opening formed in the cover $2^{b\prime\prime}$. The wall terminates in a horizontal plane, and the opening therethrough may be closed by a pivoted cap $2^g$.

The rear head $2^c$ is formed with a central bearing opening $2^{c\prime}$ through which extend the shafts $5^a$, $5^{a\prime}$, of the material agitating mechanism 5. The shafts $5^a$, $5^{a\prime}$, are driven by gearing 3 in opposite directions as will be understood by those skilled in this art. The heads $2^b$, $2^c$, are each provided with annular bosses $2^\prime$ (only one being shown) which form seats for the opposite ends of the cylinders $1^a$, $1^b$ and also serve to space them apart. Between the cylinders $1^a$, $1^\prime$, a circuitous brine way $1^{a\prime}$ is provided, this way being connected at one end with a brine supply pipe 6.

$2^h$ is an inlet duct for material, carried by the head $2^c$ and communicating at its inner end with the interior of the freezing cylinder, its outer end terminating in a horizontally disposed port $2^{h\prime}$ surrounded by a screw threaded section $2^{h\prime\prime}$.

7 indicates a tank for holding a batch of material to be frozen. The tank 7 is preferably of rectangular shape. It may be removably supported by legs $7^a$ upon the top of the freezer. The bottom of the tank 7 is inclined toward one end, preferably the rear end, to facilitate emptying of the tank, in the manner to be presently described. At its front end, the tank 7 may be provided with a transparent plate $7^b$ by means of which the height of material in the tank 7 can be readily seen.

The freezer construction above described in itself constitutes no part of my present invention.

8 indicates a conduit leading from the latch tank 7 to the freezer inlet duct $2^h$. The discharge port or opening of the conduit 8 preferably extends into this freezer inlet duct. The conduit 8 preferably comprises a vertical, tubular tapered section $8^a$, open from end to end, and an inclined section $8^b$, the outer end of which leads into and through one side wall of the vertical section. The inner end of the section $8^b$ leads through the adjacent side of the tank 7 and forms the outlet duct therefrom. The sections $8^a$, $8^b$, are preferably formed in one piece of substantially T-shape. The lower end of the vertical section $8^a$ and the upper end of the duct $2^h$ may be connected together in any suitable way, but preferably by a pair of detachably coupling members, $8^c$, $8^d$.

9 indicates a hollow cylindrical member rotatably mounted within the vertical section $8^a$. The member 9 is open from end to end and preferably extends upwardly to or beyond the upper edge of the tank 7. The member 9 serves as an inlet conduit to permit fruits and other flavoring material to be discharged directly into the inlet duct $2^h$ for the freezer. The walls of the member 9 are preferably tapering in shape and enlarged at their upper ends, as shown at $9^a$, to form a funnel shaped inlet. The upper open end of the funnel 9 terminates in a port $9^b$ which may be closed by a hinged cover 10. Near the lower end of the member 9 its walls may be thickened and properly ground, as shown at $9^{b'}$, to snugly fit the bearing surfaces formed by the inner walls of the vertical section $8^a$. 11 indicates a port formed in the wall $9^{b'}$ of the funnel member 9. The port 11 is arranged to register with the outlet end of the conduit section $8^b$ when the funnel member 9 is in one position—see Figs. 2 and 4; in this position it permits the liquid in the batch tank to flow therefrom, through the conduit section $8^b$ into the funnel member 9, which conducts the material downwardly into the duct $2^h$, and it in turn conducts the material to the freezer; but when the funnel member is rotated in its bearings, the walls of said member close the passageway through the conduit 8. From this construction it will be seen that the walls of the conduit member 9 and its port 11 constitute a valve and the walls of the vertical section $8^a$ a valve seat to control the flow of the material from the tank 7, through the conduit 8 to the freezer 1; it will also be seen that the lower portion of the inlet member 9 also forms a part of the conduit 8 when its port 11 registers with the section $8^b$. With these parts in this position, material may be introduced through the funnel 9 at the same time that the material is flowing from the batch tank to the freezer.

12 indicates devices for rotating the funnel member to open and close the passageway 8. The operating devices 12 preferably comprise an arm $12^a$ which is fixed to the member 9, and one or more links $12^b$ which extend to a point within easy reach of the operative. Where the conduit 8 leads into the rear head $2^c$ of the freezer 1, as shown in the drawings, a pair of pivotally connected-together links $12^{b'}$, $12^{b''}$ may be provided, the latter extending approximately to the front end of the freezer 1 and being slidably supported at one side of the tank 7 by a pair of brackets $12^c$. By moving the link $12^{b''}$ endwise, the conduit member 9 may be rotated in its bearings to open and close the valve.

In operation, the valve for the conduit 8 is closed; thereupon the batch tank 7 is filled with the liquid material which has been mixed for freezing. At the same time the motor 4 is started and the agitating mechanism 5 in the freezer 1 is rotated. The brine is admitted into the brine-way $1^{a'}$. The combined funnel and valve member 9 is then rotated to bring its valve port 11 into registry with the conduit section $8^b$, whereupon the liquid material flows through the valve and conduit 8 to the freezer 1. At the proper time, the cover 10 is raised and the fruit or other flavoring material is poured into the funnel 9 and conducted direct to the freezer cylinder.

It will be noted that I have provided a simple form of construction for supplying the frozen material with fruit and other material. To this end I have combined with the conduit between the batch tank and the freezer a movable inlet member and utilized the essential parts thereof as valve elements to control the flow of the liquid through said conduit. As a result, I have simplified the construction by reducing the number of coacting parts necessary to effect the filling of the freezer with the proper materials, and reduced materially the cost of manufacture.

The combined funnel and valve member 9 is preferably extended downwardly through the conduit 8 to a point beyond the connection of the section $8^a$ with the duct $2^h$ in order to eliminate completely all possibility of leakage, through the coupling $8^c$, $8^d$.

To those skilled in the art of making apparatus of the class described, many alterations in construction and widely differing embodiments and applications of my invention will suggest themselves, without departing from the spirit and scope thereof. My disclosures and the descriptions herein are purely illustrative and are not intended to be in any sense limiting.

What I claim is:

1. In apparatus of the class described, the combination with a freezing cylinder having an inlet duct, and a batch tank, of a conduit, formed in sections arranged at an angle to each other, leading from said batch tank to said duct, and a tubular member rotatably mounted in one of said conduit sections and formed in its side wall with a port adapted to be positioned in and out of registry with the other conduit section to control the flow of material therethrough from the batch tank, the tubular member being open from end to end and communicating at all times with said duct, whereby material can be introduced at any time directly into said duct irrespective of the position of said tubular member.

2. In apparatus of the class described, the combination with a head having a duct, and a batch tank, of a conduit, formed in sections arranged at an angle to each other, leading from said batch tank to said duct, and a funnel-shaped tubular member rotatably mounted in one of said conduit sections and formed in its side wall with a port adapted to be positioned in and out of registry with the other conduit section to control the flow of material therethrough from the batch tank, the tubular member being open from end to end and communicating at all times with said duct, whereby material can be introduced at any time directly into said duct irrespective of the position of said tubular member.

In testimony whereof I affix my signature, in the presence of two witnesses.

LEROY S. PFOUTS.

Witnesses:
WILLIAM H. MILLER,
FLORENCE TRUMP.